United States Patent

Tolbert

[11] Patent Number: 6,113,142
[45] Date of Patent: Sep. 5, 2000

[54] PROTECTIVE COVER

[76] Inventor: Anthony Tolbert, 4000 Roble Cir., Georgetown, Tex. 78628

[21] Appl. No.: 09/305,022

[22] Filed: May 4, 1999

[51] Int. Cl.[7] ........................................................ B32B 3/10
[52] U.S. Cl. .............................. 280/770; 428/51; 428/52; 150/166; 150/154
[58] Field of Search ................................ 428/52, 99, 47, 428/48, 51; 150/166, 167, 154; 280/770; 89/36.02

[56] References Cited

U.S. PATENT DOCUMENTS

| | | |
|---|---|---|
| 1,278,554 | 9/1918 | Arnold . |
| 3,120,682 | 2/1964 | Reffell . |
| 3,844,605 | 10/1974 | Payne . |
| 4,041,654 | 8/1977 | Nedila . |
| 4,598,883 | 7/1986 | Suter . |
| 4,867,216 | 9/1989 | McKee . |
| 4,912,886 | 4/1990 | Jannin . |
| 5,664,825 | 9/1997 | Henke et al. ............................ 150/166 |
| 5,800,006 | 9/1998 | Pettigrew . |

*Primary Examiner*—Alexander Thomas
*Attorney, Agent, or Firm*—Joseph F. Long

[57] ABSTRACT

A protective cover over the surface of machinery such as an automobile or airplane protects the vehicle from both rain and hail with dish shaped individual units fastened to a heavy cloth with the dish shaped individual units preventing direct impact and spreading the glancing impact so as to prevent damage from even large hailstones.

4 Claims, 2 Drawing Sheets

PROTECTIVE COVER

SUMMARY OF THE INVENTION

The invention comprises a cover with a heavy weight cloth backing with oval dish shaped plastic units fastened thereto in an overlapping water proof fashion. Rain or hail striking the cover will necessarily strike the upper surface of individual units at an angle reducing direct hail impact. The glancing impact is further spread by the overlapping dish shaped units wherein the "footprint" through the cloth to the underlying metal or material being protected is about double the perimeter of the single unit. Each single unit is fastened to the base cloth to prevent wind from raising the units to cause a non rain proof covering. In units designed for machinery covers tie down straps are integrally fastened to the base cloth with grommets in the cloth perimeter. Grommets and tie down straps allow lacing smaller units together and facilitate fastening of the protective cover where needed.

DESCRIPTION OF THE INVENTION

Figure 1:
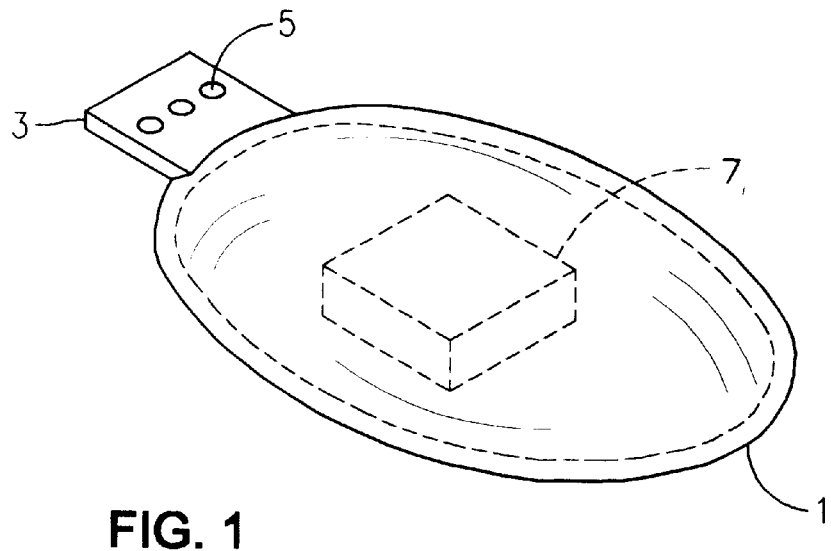
FIG. 1 shows the underside of a single protective unit.

The invention may best be described from the drawings. In FIG. 1 an oval dished protector unit 1 with tab 3 and three holes 5 is shown. The dished shaped protector unit 1 may be from two to eight inches long with an oblong piece of foam 7 approximately one fourth inch thick and sized to cover about one half of the inner area to act as reinforcement and as a cushion to further spread the impact force. With nylon rivets or similar fasteners located as shown at the base of tab 3 the wind will cause only a small lifting of the main body 1 of each protector unit.

Figure 2:
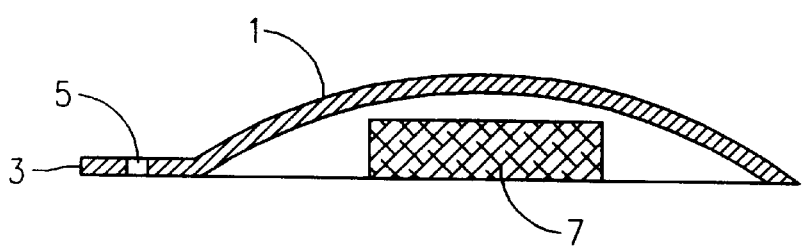
FIG. 2 shows a side view of the first embodiment of a single protective unit.

In FIG. 2 a side view of unit 1 is shown indicating structure of the first embodiment of the individual protector units with numbers as previously described and with the body of the unit all of one thickness.

Figure 3:
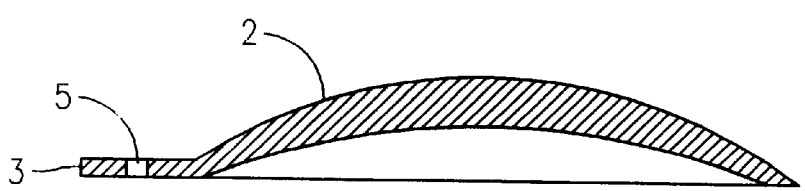
FIG. 3 shows a side view of a second embodiment of a single protective unit.

FIG. 3 shows a second embodiment with the single protector unit 2 being similarly sized and shaped to unit 1 but with a thicker raised portion to preclude the necessity of using foam block 7, FIG. 1. Other numbers are as described.

Figure 4:
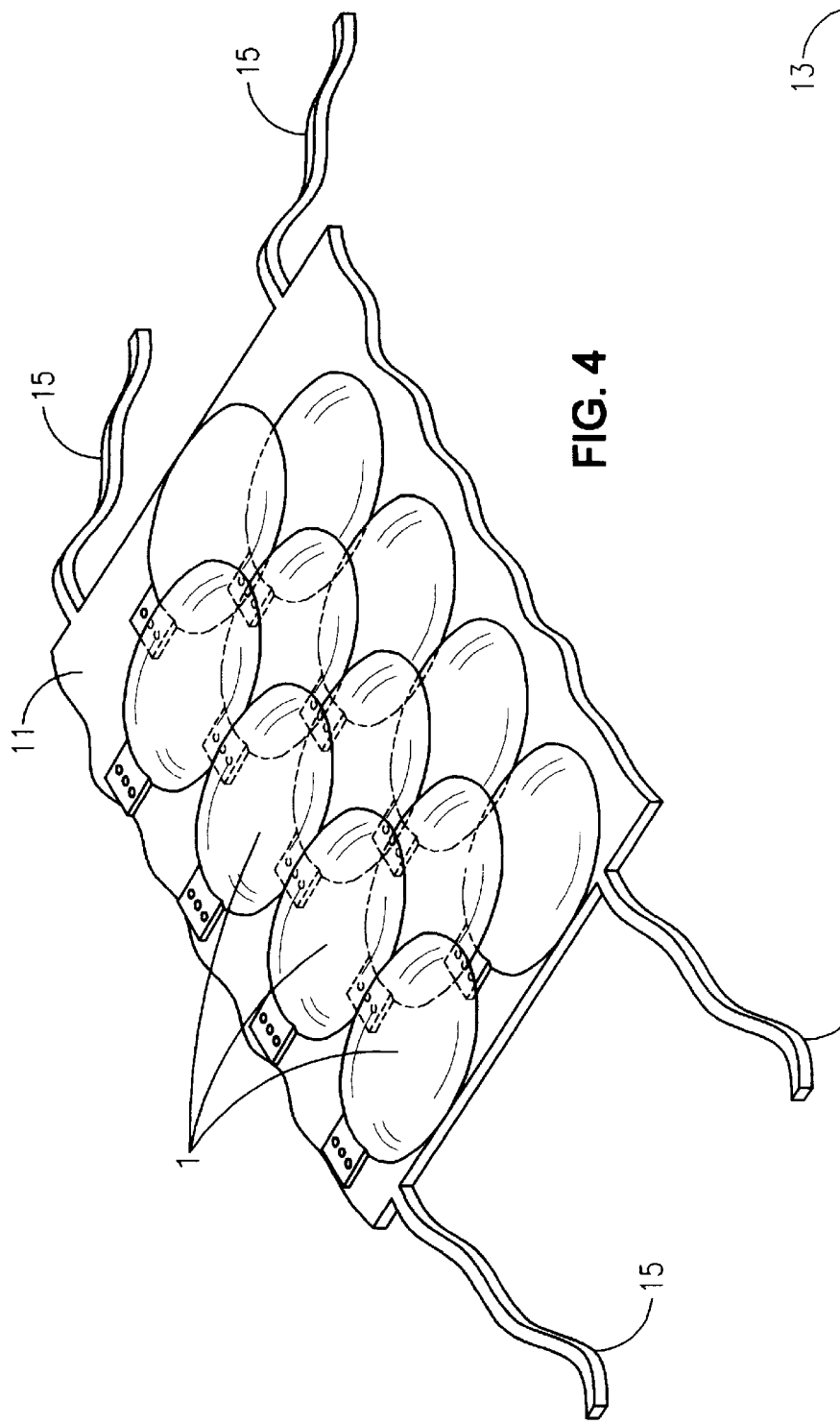
FIG. 4 indicates how the single units are used to provide a rain and hail proof covering.

In FIG. 4 the covering 9 is partially shown with small units 1 riveted into place to indicate water proof overlapping of the units 1 riveted on to a heavy strong cloth backing such as Nylon or acrylic 11. Sewing or stapling would also be an acceptable type of fastening. Note that hail stones or rain drops would always be striking a curved surface to reduce the force of a direct impact and the force of the glancing impact is spread over a relatively large surface. Calculations indicate that a two inch size hailstone should not dent an airplane wing that is properly covered with this invention. Tie down fasteners 15 are used for covering a piece of machinery such as an automobile or an airplane. When the unit is used as a roof cover the tiedown fasteners are omitted an the overall units with the cloth backing may be installed with conventional roofing staplers. The oval shaped single units may be from two to eight or ten inches in length.

Figure 5:
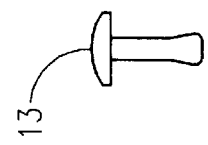
FIG. 5 indicates a rivet type fastener for fastening of individual units to a flexible cloth base.

FIG. 5 shows a Nylon rivet 13. The rivet is a preferred fastener but several other type fasteners would be satisfactory. By fastening at the base of tab 3, FIG. 1 the wind will not lift the small units enough to allow rain to enter.

What is claimed is:

1. A protective cover comprising:
   1) a breathable cloth base,
   2) a multiplicity of single thickness, oval dish shaped plastic units with each of said units having a rectangular tab with a minimum of two holes therein, said holes being located at a base of said tab; said oval dish shaped units being fastened to said breathable cloth base in an overlapping water proof fashion with each of said units fastened through said holes to said breathable cloth base.

2. A protective cover as in claim 1 further comprising a piece of plastic foam approximately onE fourth inch thick glued inside each of said dish shaped protector units to reinforce said protector unit and acting to further spread the impact of a missile such as a hailstone.

3. A protective cover as in claim 1 further comprising multiple tie down fasteners attached to said breathable cloth base.

4. A protective cover comprising:
   1) a breathable cloth base,
   2) a multiplicity of oval dish shaped plastic units with each of said units having a thicker central reinforcing section and with each of said units having a rectangular tab with a minimum of two holes therein, said holes being located at a base of said tab; said oval dish shaped units being fastened to said breathable cloth base in an overlapping water proof fashion with each of said units fastened through said holes to said breathable cloth base.

* * * * *